Stein & Haering,
Elevator.
No. 98,203. Patented Dec. 21, 1869.

Witnesses:
Geo. W. Mabee
Edgar Tate

Inventors:
F. Stein
H. Haering
per Mmm & Co.
Attys.

United States Patent Office.

FRANCIS STEIN AND HENRY HAERING, OF NEW YORK, N. Y.

Letters Patent No. 98,203, dated December 21, 1869.

IMPROVEMENT IN ELEVATORS.

The Schedule referred to in these Letters Patent and making part of the same.

*To all whom it may concern:*

Be it known that we, FRANCIS STEIN and HENRY HAERING, of the city, county, and State of New York, have invented a new and useful Improvement in Elevators; and we do hereby declare that the following is a full, clear, and exact description thereof, which will enable others skilled in the art to make and use the same, reference being had to the accompanying drawings, forming part of this specification.

This invention relates to improvements in elevators or hoisting-apparatus for hotels and warehouses, either inside or outside, and also applicable for use as fire-escapes.

It consists in the application, to a pair of vertical posts or ways with toothed racks, of a carriage or platform, having a shaft provided with a gear-wheel at or near each end, and gearing into the toothed rack; also, having in suitable cases, sliding on the posts, a set of hoisting-gears gearing with the toothed racks, and operated by hand-cranks, and provided with ratchet-wheels holding-pawls, and friction-apparatus, arranged in a peculiar way, for elevating the platform, holding it in any desired position for governing its descent, all as hereinafter specified.

Similar letters of reference indicate corresponding parts.

A represents the vertical post or ways, and
B, the toothed racks thereon.
C is the platform, and
D, the shaft supported on it, and extending from one post to the other, and gearing, by pinions E, with the toothed racks.

F represents the cases or frames, fitted to the posts to slide up and down, and containing the operating and holding-gears.

G is the crank-shaft, with pinion H, gearing with the intermediate wheel I, which gears with the large wheel K, on the shaft of which is a pinion, L, gearing with the rack B of the post.

Figure 1:
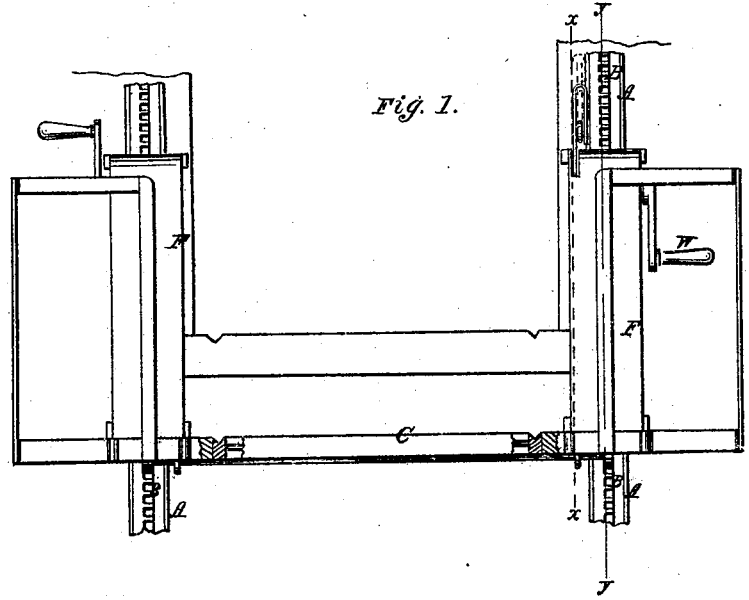
Figure 1 is a front elevation of our improved hoisting-apparatus.
Figure 2:
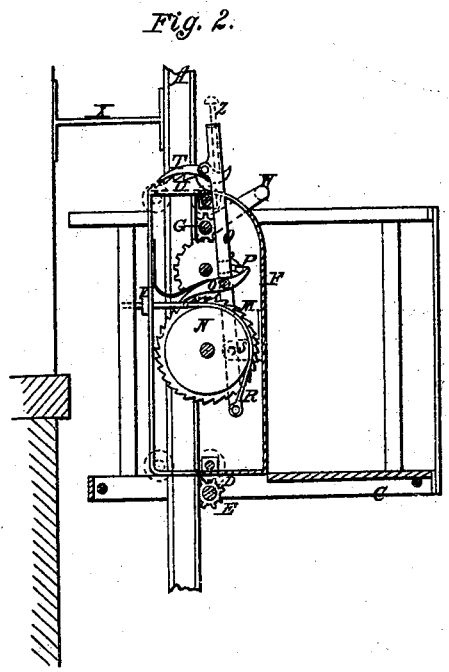
Figure 2 is a section through one of the sets of hoisting-apparatus, taken on the line x x of fig. 1.
Figure 3:
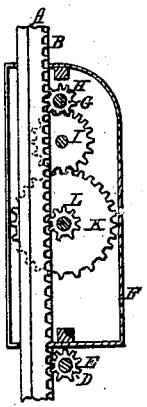
Figure 3 is a section through the same, on the line y y of fig. 1.

This large wheel K has a ratchet-disk, M, and a smooth friction-disk, N, attached to or made in connection with it, as shown in fig. 2.

O is a holding-pawl, pivoted to the case, and working with the ratchet-disk M. The rear end is curved upward, to be acted on by a stud-pin, P, on the line Q, when the latter is moved, to cause the friction-strap R to bear on the disk N, to throw it out of action with the said ratchet-disk.

This lever Q is pivoted to a stud, S, projecting from the case, and rises up through the top of the latter, terminating in a handle, and has a pawl, T, working into a notched bar, U, to hold the friction-strap on the wheel or disk N. The said strap is connected by one end to the case at V, and by the other to the lower end of the lever Q, so that when the upper end of the hand-lever Q is drawn away from the post, the strap will be forced down upon the disk N. At the same time the pawl O will be lifted out of connection with the ratchet-wheel M.

The persons standing on the platform, and turning the cranks W, may work it up or down, as required, carrying freight or other matters.

The arrangement here shown, of the working-gears and holding-devices, differs from that in the patent, No. 93,019, for adjustable scaffolds, by the introduction of the intermediate gear-wheel I between the pinion and the large wheel K; also, in the connection of the friction-strap R to the end of the lever Q, having its fulcrum above the end, and also in the arrangement of the holding-pawls.

The object of the wheel I is to so arrange the direction of the movements, that when the posts A are connected to brackets projecting from the side of a wall, as here shown, the operators may stand facing the wall, in turning the cranks, pushing from them in the upper sweep, and pulling toward them in the lower sweep, which is the most preferable action.

The cases F, or frames, are so connected to the posts as to pass the brackets or arms X, projecting from the wall to support the posts.

We propose to arrange, in the top of the hand-lever Q, a trip-rod, Z, in connection with the end of the pawl T, to throw it out of connection with the ratchet-bar U.

Having thus described our invention,
We claim as new, and desire to secure by Letters Patent—

1. The combination of the posts A, toothed racks B, platform C, shaft D, pinions E, cases or frames F, and operating-gears H I K, and hand-cranks, all substantially as specified.

2. The arrangement, with the wheel K and disks N M, of the lever Q, friction-strap R, pawl O, stud-pin P, pawl T, and ratchet U, substantially as specified.

3. The arrangement, with the posts A and brackets X, of the cases or frames F, for sliding past the said brackets, substantially as specified.

The above specification of our invention signed by us, this 1st day of November, 1869.

FRANCIS STEIN.
HENRY HAERING.

Witnesses:
GEO. W. MABEE,
ALEX. F. ROBERTS.